Aug. 15, 1933.   F. W. KENNEDY   1,922,812
GEAR WHEEL
Filed Oct. 31, 1931   2 Sheets-Sheet 1
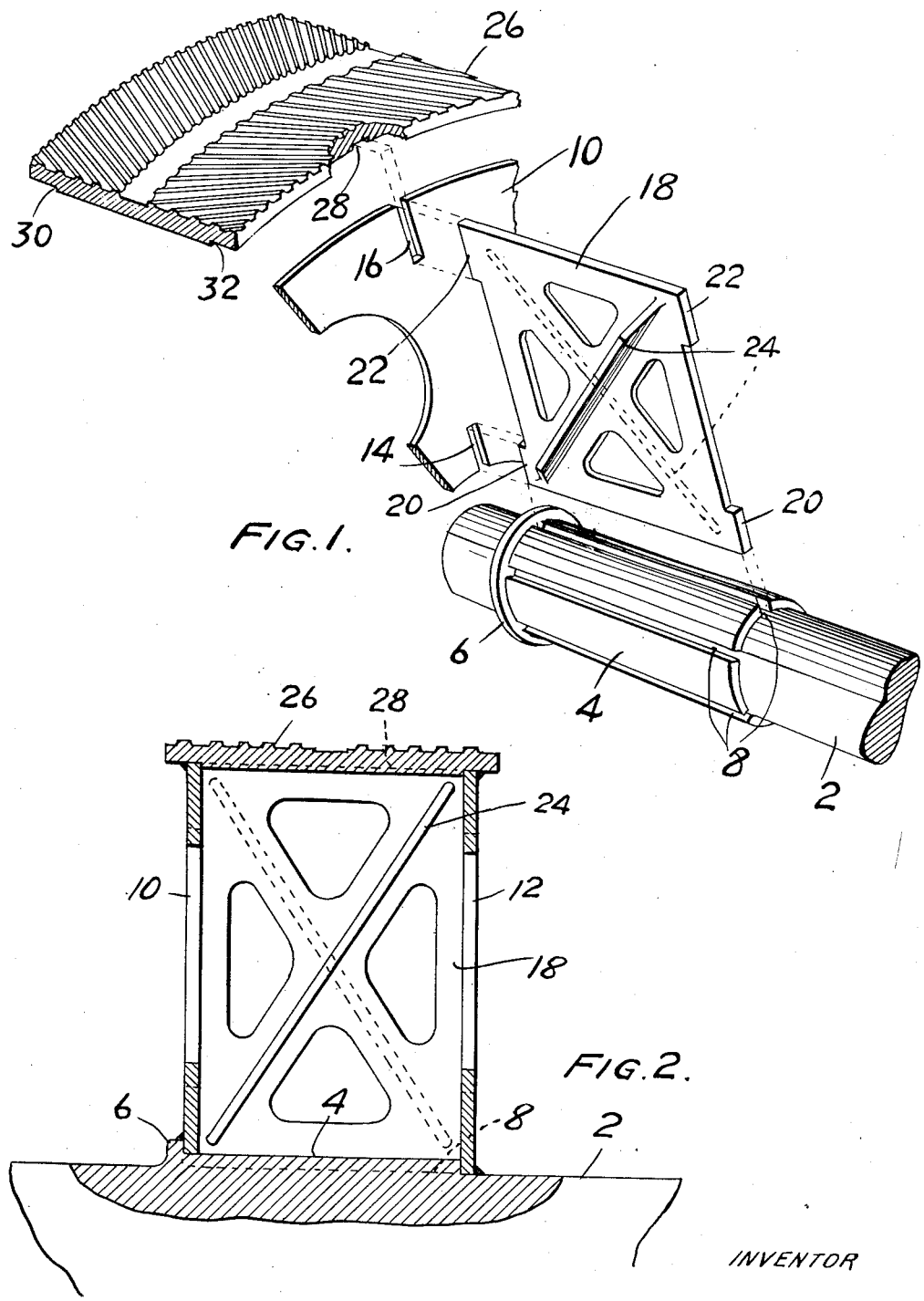
INVENTOR
Frank W. Kennedy
BY
Busser & Harding
ATTORNEYS.
WITNESS:
Robt R Kitchel.

Aug. 15, 1933.  F. W. KENNEDY  1,922,812
GEAR WHEEL
Filed Oct. 31, 1931  2 Sheets-Sheet 2

WITNESS:

INVENTOR
Frank W. Kennedy
BY
ATTORNEYS.

Patented Aug. 15, 1933

1,922,812

UNITED STATES PATENT OFFICE 1,922,812

GEAR WHEEL

Frank W. Kennedy, Trenton, N. J., assignor to De Laval Steam Turbine Company, Trenton, N. J., a Corporation of New Jersey Application October 31, 1931. Serial No. 572,321

7 Claims. (Cl. 74—28)

This invention relates to a welded gear structure particularly designed for the construction of gears of large size.

A construction of large gears such as are used in the reduction gearing of turbines is considerably facilitated by making these gears of separate parts secured together by welding, or otherwise. It is necessary, of course, that the gear structure be of such rigid form that torque will be properly transmitted from the periphery to the shaft without endangering the structure.

It is the primary object of the present invention to provide a construction suitable for gears of large size used for speed reduction or other purposes. It will be clear, however, that a similar construction might be adopted for large pulleys, or the like.

Specific objects of the invention relating particularly to details of construction will become apparent from the following description read in conjunction with the accompanying drawings in which:

Fig. 1 is a perspective view showing fragments of one form of the improved construction disassembled to illustrate their interconnections;

Fig. 2 is a partial axial section of the same;

Figure 3:
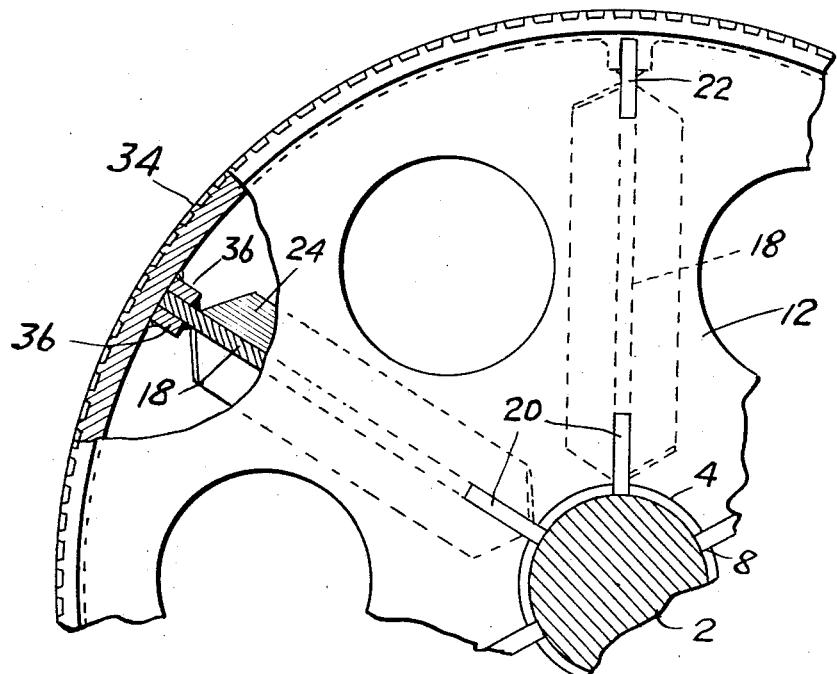
Fig. 3 is a fragmentary section taken transversely to the supporting shaft illustrating a modified construction.

Referring first to Figs. 1 and 2 there is shown a shaft 2 provided with an enlarged portion 4 and a shoulder 6. In this modification the part of the device which may be said to constitute the hub of the wheel is integral with the shaft. As will be later pointed out, the hub of the wheel may be separate from the shaft. The enlarged portion 4 is provided with axially extending slots 8 which may or may not be continued through the shoulder 6. End plates 10 and 12 of annular form are designed to receive between them radially extending steel plates or webs 18. The circular plates 10 and 12 are provided with inner and outer slots 14 and 16 arranged to be aligned with the slots 8. The radial blades 18 are provided with corresponding projections 20 and 22 adapted to be received within the slots 14 and 16 upon assembly. The inner ends of the plates 18 are received within the slots 8.

Inasmuch as the plates may be of considerable extent they are preferably reinforced by stiffening members 24 which may be secured thereto, or, in certain cases, may be made integral therewith.

The gear band 26 which is preferably made from a seamless rolled forging, but which may also be made from a split band welded together at the joint, is provided with axially extending slots 28 arranged to receive the outer ends of the plates 18. The gear band 26 is under-cut at 30 and 32 to receive the outer edges of the annular plates 10 and 12.

When the parts are assembled in the manner illustrated in Fig. 2 they are welded together at the various joints as indicated in that figure. For example, the plates 10 and 12 are welded to the shaft or hub and also to the gear band 26. Also the plates 18 are preferably welded to the hub or shaft, the gear band and the plates 10 and 12.

By reason of this construction, during running the strain is not taken entirely by the welded joints but the parts are effectively keyed together by reason of the inter-lockings of the various parts in the slots; accordingly, even though the wheel may be of large diameter, there is provided a rigid and strong structure.

In some cases, particularly where a very thin gear band is provided it may be objectionable to slot the same as indicated at 28 in Figs. 1 and 2. In such cases an alternative construction such as illustrated in Fig. 3 may be adopted. In this case the band 34 has welded thereto axially extending members 36 spaced so as to provide axially extending slots adapted to receive the outer ends of the plates 18.

Figures 4, 5:
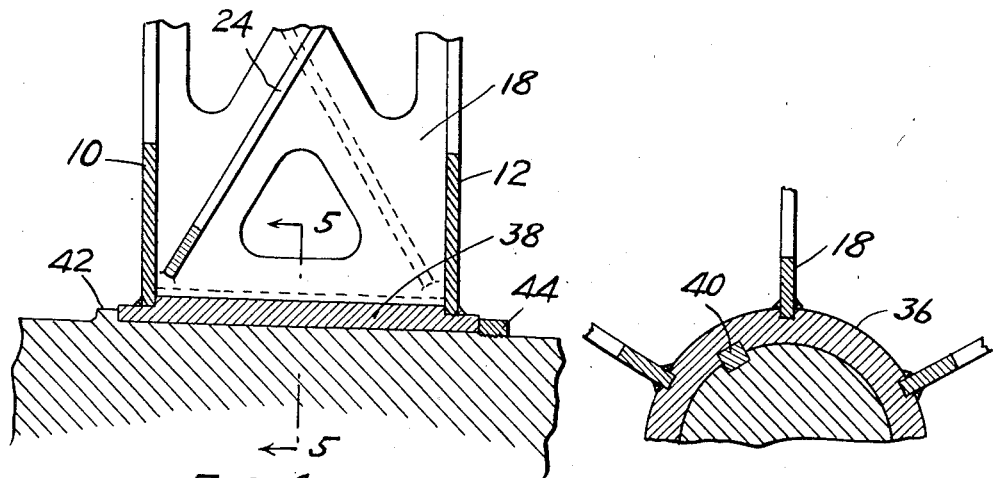
Fig. 4 is a fragmentary axial section illustrating a further modification.
Fig. 5 is a transverse section taken on the plane indicated by the line 5—5 in Fig. 4.

The type of construction which may be used where the hub is made separate from the shaft is illustrated in Figs. 4 and 5. In this case the separate hub 38 is keyed as at 40 to the shaft abutting at one end an annular shoulder formed on the shaft and being jammed against this shoulder by a suitable nut 44 threaded on the shaft. The member 38 is provided with axially extending slots, the remaining parts of the construction being similar to those illustrated in the first modification. If desirable, the separate hub may be tapered interiorly and forced upon a corresponding taper on the shaft.

While only two end plates 10 and 12 have been illustrated, in case the gear band is very wide more of these plates may be provided in an obvious fashion having located between pairs of them radially extending plates such as 18.

It will be obvious that numerous modifications of the invention may be made without departing from the spirit of the following claims.

What I claim and desire to protect by Letters Patent is:

1. A gear wheel construction including means providing an axially slotted hub, a band providing inwardly directed axially extending slots, radial webs having the inner ends engaged in the hub slots and their outer ends engaged in the band slots, annular radially extending members having key-and-slot engagement with the webs, and means holding the parts in assembled relationship.

2. A gear wheel construction including means providing an axially slotted hub, and a band providing inwardly directed axially extending slots, radial webs having the inner ends engaged in the hub slots and their outer ends engaged in the band slots, annular radially extending members having key-and-slot engagement with the webs, said parts being welded together.

3. A gear wheel construction including means providing a hub, a band, webs extending axially between the hub and band, and means retaining the webs in proper relationship including an annular member having key-and-slot engagements with the webs near the hub and also near the band.

4. A gear wheel construction including means providing a hub, a band, webs extending axially between the hub and band, and means retaining the webs in proper relationship including annular members at the ends of the webs having key-and-slot engagements with the webs near the hub and also near the band.

5. A gear wheel construction including means providing a hub, a band, webs extending axially between the hub and band, and means retaining the webs in proper relationship including an annular member having key-and-slot engagements with the webs near the hub and also near the band, the annular member and the webs being also secured together by welding.

6. A gear wheel construction including means providing a hub, a band, webs extending axially between the hub and band, and means retaining the webs in proper relationship including annular members at the ends of the webs having key-and-slot engagements with the webs near the hub and also near the band, the annular members and the webs being also secured together by welding.

7. A gear wheel construction including means providing a hub, a band, webs extending axially between the hub and band, and means retaining the webs in proper relationship including an annular member having key-and-slot engagements with the webs near the hub and also near the band, the webs comprising plates reinforced by stiffening members welded thereto.

FRANK W. KENNEDY.